United States Patent [11] 3,558,065

| [72] | Inventor | Cornelis Van Der Lely<br>7 Bruschenrain, Zug, Switzerland |
|---|---|---|
| [21] | Appl. No. | 735,847 |
| [22] | Filed | June 10, 1968 |
| [45] | Patented | Jan. 26, 1971 |
| [32] | Priority | June 16, 1967 |
| [33] | | Netherlands |
| [31] | | 6,708,370 |

[54] SPREADING IMPLEMENTS
18 Claims, 6 Drawing Figs.

[52] U.S. Cl. .................................................. 239/661,
239/683; 222/178, 222/241
[51] Int. Cl. ........................................................ A01c 19/00
[50] Field of Search .......................................... 222/178,
241, 242, 333; 239/683, 661, 676, 665, 164, 670

[56] References Cited
UNITED STATES PATENTS
| 2,243,996 | 6/1941 | Baughman | 222/242X |
| 2,521,565 | 9/1950 | Carelock | 239/661X |
| 2,532,913 | 12/1950 | Higginbottom | 222/241 |
| 2,550,872 | 5/1951 | Shaw | 239/661X |
| 2,594,084 | 4/1952 | Skibbe et al. | 239/661 |
| 2,652,261 | 10/1953 | Presler | 239/661 |
| 3,241,695 | 1/1969 | Phelps et al. | 239/164 |

*Primary Examiner*—Robert B. Reeves
*Assistant Examiner*—H. S. Lane
*Attorney*—Mason, Mason and Albright ABSTRACT: This invention relates to spreading implements of the kind comprising a frame movable over the ground, a hopper or other container for material to be spread and a member for spreading the material, the hopper or other container accommodating an agitator which is connected to a shaft located adjacent a lower region of the hopper or other container.

INVENTOR
CORNELIS VAN DER LELY
by
Mason, Mason & Albright
Attorneys

INVENTOR
CORNELIS VAN DER LELY
by Mason, Mason & Albright
Attorneys

SPREADING IMPLEMENTS

An object of the invention is the provision of a simple and effective spreading implement of the kind set forth above.

According to the invention, there is provided a spreading implement of the kind set forth, wherein at least said lower region of the hopper or other container is supported by the frame, said shaft being rotatably mounted, independently of the hopper or other container, in a bearing that is carried by a portion of the frame, and wherein the frame includes a support by which the implement can stand on the ground, the support being independent of said frame portion and at least part of the support being at a lower level than said bearing.

Figure 1:
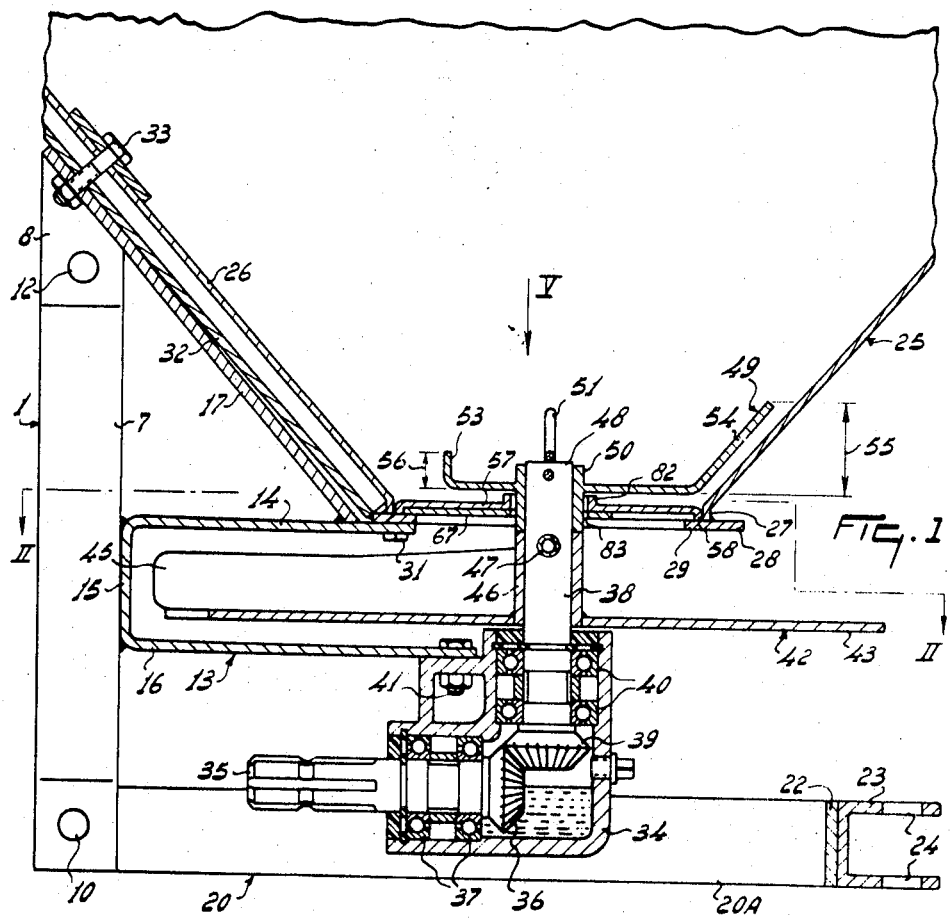
Figure 3:
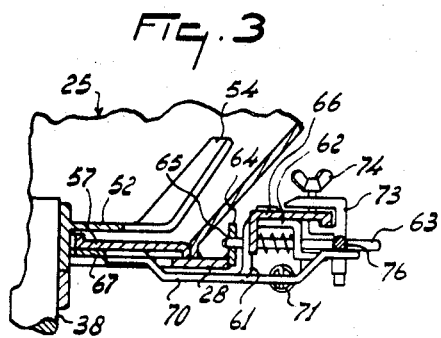
Figure 4:
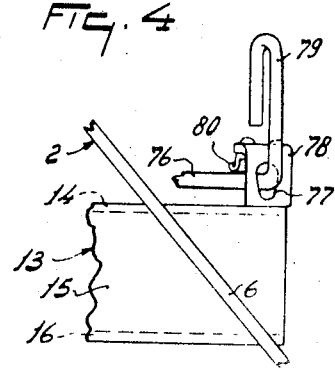
Figure 2:
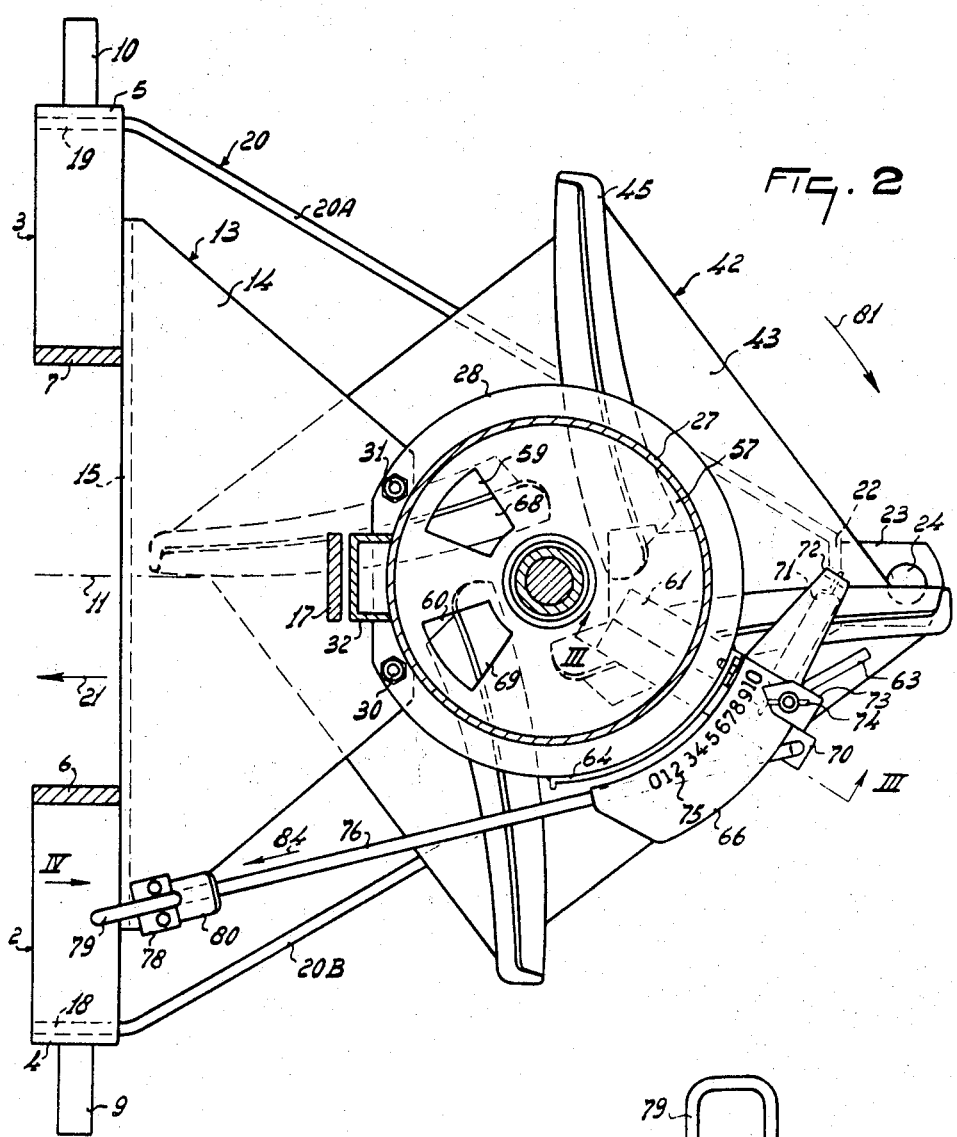
Figure 5:
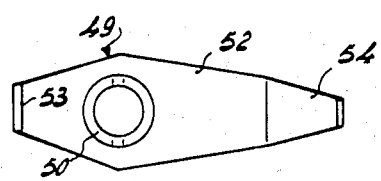
Figure 6:
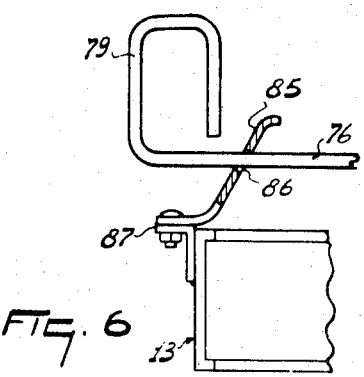

For a better understanding of the invention, and to show how the same may be carried into effect, reference will now be made, by way of example, to the accompanying drawings, in which:

FIG. 1 is a vertical section of a spreading implement in accordance with the invention, the section containing the longitudinal axis of the implement, FIG. 2 is a section taken on the line II-II of FIG. 1, FIG. 3 is a section taken on the line III-III of FIG. 2, FIG. 4 is a scrap elevation as seen in the direction indicated by the arrow IV of FIG. 2, FIG. 5 is a scrap plan view as seen in the direction indicated by the arrow V of FIG. 1, and FIG. 6 is a scrap elevation illustrating an alternative construction of certain of the parts that can be seen best in FIG. 4 of the drawings.

Referring to the drawings, the spreading implement which is illustrated has a frame that is generally indicated by the reference 1, said frame includes two rigid strips 2 and 3 respectively that are located at opposite sides of a vertical plane 11 containing the longitudinal axis of the implement. The two strips 2 and 3 have lowermost vertical portions 4 and 5 respectively, these portions being connected by upwardly convergent portions 6 and 7 respectively to two upper vertical portions of which only the upper vertical portion 8 can be seen in FIG. 1 of the drawings. The two upper vertical portions that have just been mentioned are located close to one another in vertically parallel relationship. The lower vertical portions 4 and 5 are provided with horizontally aligned pins 9 and 10 respectively while the upper vertical portion 8 and its fellow are formed with horizontally aligned holes 12. The pins 9 and 10 are intended for releasable connection to the free ends of the lower lifting links of a three-point lifting device or hitch while the holes 12 are intended for connection to the free end of the upper adjustable lifting link of such a device or hitch.

The strips 2 and 3 are interconnected by a plate 13 that affords a profiled member of the frame. The plate 13 includes a trapezoidal upper portion 14, a portion 15 that is contained in a vertical plane perpendicular to the plane 11 and a lower portion 16 which is also of trapezoidal configuration. As can be seen from FIG. 1 of the drawings, the portions 14 and 16 of the plate 13 are both contained in corresponding substantially horizontal planes, the portion 16 projecting rearwardly from the strips 2 and 3, with respect to the intended direction of operative travel of the implement, over a slightly greater distance than the portion 14. The direction which has just been mentioned is indicated by an arrow 21 in FIG. 2 of the drawings. A stiffening strip 17 rigidly interconnects the upper portion 14 of the plate 13 and the two upper vertical portions 8 of the strips 2 and 3.

The opposite ends 18 and 19 of a strip 20 are fastened to the lower vertical portions 4 and 5 of the strips 2 and 3, the strip 20 being approximately V-shaped in plan view (FIG. 2) with two limbs 20A and 20B that converge in a direction opposite to the direction 21, the rearmost ends of the two limbs 20A and 20B being interconnected by a short transverse portion 22. A forked bracket 23 having upper and lower horizontal limbs has its base welded or otherwise rigidly secured to the rearmost side of the transverse portion 22 of the strip 20. The limbs of the bracket 23 are formed with vertically aligned holes 24. A hopper 25 is fastened to the frame 1, said hopper including an inverted frustoconical portion 26 the lowermost end of which is formed as a circular cylindrical rim 27. A horizontally disposed ring 28 is secured to the lowermost edge of the rim 27 in such a way that part of the ring is disposed outwardly of the edge of the rim while part is disposed internally thereof. The internal part of the ring 28 affords a support 29. Bolts 30 and 31 are employed to secure the hopper 25 and the ring 28 to the upper portion 14 of the plate 13. A beam 32 of channel-shaped cross section extends upwardly at the front of the hopper 25 from the upper portion 14 of the plate 13 to the top of said hopper. The lowermost end of the beam 32 is secured to the portion 14 of the plate 13 and also to the ring 28 while a bolt 33 that is entered through the wall of the hopper 25 and through the beam 32 secures those parts to the upper end of the stiffening strip 17.

A gear box 34 is fastened to the rearmost edge of the lower portion 16 of the plate 13 by bolts 41, a rotary input shaft 35 being rotatably mounted in said gear box with the aid of horizontal ball bearings 37 in such a way that its leading splined or otherwise keyed end projects forwardly from said gear box. The rearmost end of the horizontal input shaft 35 that is located internally of the gear box 34 carried a bevel pinion 36 whose teeth are in mesh with those of a second bevel pinion 39 carried at the lowermost end of a vertical shaft 38 that is rotatably mounted in the gear box 34 with the aid of vertical ball bearings 40. It is preferred that the bevel pinion 36 should be integral with the shaft 35 and, similarly, that the bevel pinion 39 should be integral with the shaft 38. The uppermost end of the shaft 38 projects above the gear box 34 and has a spreading member 42 secured to it. The spreading member includes a horizontally disposed square plate 43 to the uppermost surface of which four gently curved spreading blades 45 are secured, the outermost ends of the blades 45 projecting a short distance beyond the plate 43 at the four corners of the latter. The center of the plate 43 is secured to a vertical sleeve 46, this sleeve surrounding the shaft 38 to which it is secured by a transverse driving pin 47.

An extreme upper end region 48 of the shaft 38 is located just inside the bottom of the hopper 25, said region 48 having a stirring agitator 49 releasably secured to it. The agitator 49 includes a vertical sleeve 50 which is arranged around the upper end region 48 of the shaft 38 and which is releasably secured thereto by a resilient clip 51 in such a way that it can be quickly connected to, and quickly released from, said upper end region 48. The clip 51 cooperates with a small transverse bore in the upper end 48 of the shaft 38. As can be seen best in FIG. 5 of the drawings, the stirring agitator 49 includes a horizontally disposed double trapezoidal plate 52 which tapers away from the sleeve 50 in two opposite directions so that the plate is at its greatest width in the region of the sleeve 50. One trapezoidal part of the plate 52 tapers in a more pronounced fashion than the other and this part has an end 53 which is bent over perpendicularly upwardly with respect to the greater part of said plate. The other trapezoidal part of the plate 52 has an end 54 which is bent over upwardly at an angle of about 50° to the horizontal, said end 54 extending parallel to the frustoconical wall of the hopper 25 at a short distance from that wall. The end 53 is spaced from the rim 27 by a distance which is approximately equal to half the radius of the cylindrical rim 27. The vertical height 55 (FIG. 1) of the end 54 is approximately twice the vertical height 56 of the end 53.

The hopper 25 is provided with an outlet plate 57 that is adjustable about the substantially vertical axis of the shaft 38, said outlet plate 57 having an outermost downwardly bentover rim 58 whose lowermost edge bears against the upper surface of the ring 28 just inside the wall of the hopper 25. The outlet plate 57 effectively affords the bottom of the hopper 25 and is formed with two relatively spaced and sector-shaped outlet ports 59 and 60. A strip 61 is secured to the lowermost surface of the outlet plate 57 and projects outwardly beyond the ring 28. The strip 61 affords a setting arm for the outlet plate 57 and includes an inverted V-shaped portion 62 (FIG. 3) through the limbs of which a spring-loaded pin 63 is entered. A generally horizontally disposed guide 66 of curved configuration is fastened to the portion 62 of the strip 61, the center of curvature of the guide 66 substantially coinciding with the axis of rotation of the shaft 38. A curved strip 64 whose center of curvature also substantially coincides with the axis of rotation of the shaft 38 has its lowermost edge secured to the outermost edge of the ring 28, said strip 64 being formed with a row of holes 65 into any chosen one of which the tip of the spring-loaded pin 63 can be entered.

A control member 67 in the form of a circular disc is turnable about the axis of rotation of the shaft 38 immediately beneath the outlet plate 57, an edge region of the control member 67 bearing downwardly against the uppermost surface of that part of the ring 28 which is located internally of the rim 27. The control member 67 is formed with two openings 68 and 69 that are of the same shape, size and relative disposition as the outlet ports 59 and 60, the openings 68 and 69 being arranged to cooperate with those outlet ports. The control member 67 has an adjusting arm 70 to which one end of a tension spring 71 is anchored, the opposite end of said tension spring 71 being secured to a bracket 72 projecting from one side of the strip 61. A stop 73 which incorporates a pointer is slidable along the outer curved edge of the guide 66 and can be clamped to that edge, at any chosen position therealong, by tightening a wing nut 74. The pointer of the stop 73 moves along a scale 75 marked on the upper surface of the guide 66, said scale 75 being comprised of the numerals from "0" to "10".

The adjusting arm 70 has a control rod 76 pivotally connected to its outermost end, said rod 76 being entered through a hole 77 (FIG. 4) in a bracket 78 mounted at that corner of the trapezoidal portion 14 of the plate 13 that is closest to the rigid strip 2. The hole 77 is of slotted formation and tapers downwardly while the bracket 78 carries a blade spring 80 which urges the rod 76 downwardly along the slotted hole 77. The end of the rod 76 that is located beyond the bracket 78 is bent over upwardly to form a hooklike handle 79. The outlet plate 57 and the control member 67 are centered around the shaft 38 due to their outermost edges being surrounded by the circular cylindrical rim 27. Both the plate 57 and the member 67 surround the sleeve 50 with an appreciable degree of clearance, the plate 57 being formed with an upwardly directed internal rim 82 whose uppermost edge is very close to the lowermost surface of the plate 52 of the agitator 49 so that the opening 83 between the wall of the sleeve 50 and the internal edge of the control member 67 is almost completely closed.

In the use of the spreading implement which has been described, the pins 9 and 10 and the holes 12 are employed to connect the frame 1 to the lower and upper lifting links of the three-point lifting device or hitch of an agricultural tractor or other vehicle and the leading splined or otherwise keyed end of the shaft 35 is placed in driven connection with the power take off shaft of the same tractor or other vehicle by way of an intermediate telescopic transmission shaft (not shown) having universal joints at its opposite ends. The spreading member 42 can thus be caused to rotate in the direction indicated by an arrow 81 in FIG. 2 of the drawings. When the outlet ports 59 and 60 are open, powdered or granular material contained in the hopper 25, such as fertilizer, will pass therethrough to the rotating spreading member 42 whose blades 45 will distribute the material over a broad strip of land. The general direction in which the material is spread from the implement can be varied by turning the outlet plate 57 and the control member 67 in common about the axis of the shaft 38. To this end, the pin 63 is withdrawn from one of the holes 65 and is inserted in a different hole. The outlet plate 57 will thus have been turned about the axis of the shaft 38 to bring the outlet ports 59 and 60 to different angular settings about said axis. The control member 67 maintains its original position with respect to the outlet plate 57. During a spreading operation, the rotating agitator 49 tends to prevent caking and bridging of the material in the hopper 25 and to promote a constant delivery of the material through the outlet ports 59 and 60. The close proximity of the rim 82 to the lower side of the plate 52 prevents any appreciable quantity of the material from leaving the hopper 25 through the opening 83.

It will be appreciated that the degree of register between the openings 68 and 69 and the outlet ports 59 and 60 governs the quantity of material per unit time which reaches the spreading member 42 from the hopper 25. The degree of register is altered by turning the control member 67 relative to the outlet plate 57, the adjusting arm 70 being moved along the guide 66 to this end. The position of the adjustable stop 73 determines the position of the control member 67 relative to the outlet plate 57 and it will be remembered that the arm 70 is urged against the stop 73 by the spring 71. In the illustrated setting in which the pointer of the stop 73 is in register with the number "10" on the scale 75, the outlet ports 59 and 60 are open to their maximum extent because the openings 68 and 69 are in substantially exact register therewith. It will be realized that, when the pointer of the stop 73 is in line with the numeral "0", the outlet ports 59 and 60 are completely closed. The ports 59 and 60 can be closed quickly by pulling the control rod 76 in the direction indicated by an arrow 84 in FIG. 2 of the drawings. To enable this to be done easily, the rod 76 should be raised slightly so that it can move through the wide part of the hole 77. Upon releasing the handle 79, the blade spring 80 will push the rod 76 downwardly into the restricted part of the hole 77 so that the rod 76 will be prevented from moving back in a direction opposite to the arrow 84 so that the outlet ports 59 and 60 will remain closed until action is taken to reopen them. This is done merely by lifting the handle slightly whereupon the spring 71 moves the arm 70 back into contact with the stop 73. The ports 59 and 60 will then have been reopened to exactly the same extent as they were before they were closed by pulling the rod 76.

During distribution, the vertical portion 15 of the profiled plate 13 acts as a screen to prevent any material being thrown forwardly by the spreading member 42 in approximately the direction 21. That region of the spreading member 42 which is foremost at any time is located between the overlying plate portion 14 and the underlying plate portion 16. If desired, the plate portions that have just been mentioned may have bent over rims for reinforcing purposes since said plate portions 14 and 16 are portions of the frame which support the hopper 25 and the spreading member 42 respectively. Other profiles may, if desired, be given to the plate portions 14 and 16 for stiffening purposes.

The draw bar of a wagon carrying a bulk supply of material to be spread may, for example, be connected to the forked bracket 23. When the implement is to be transported, its hopper may be removed from the frame 1 by releasing the bolts 30, 31 and 33. A number of the parts of the implement can then be located inside the hopper 25 so that the whole implement can be packed in a fairly small volume of space. The implement may also be stored in this way during seasons of the year when it will not be in use. When a large number of the implements are to be transported or stored together, their hoppers 25 can be nested one inside the other. The implement which has been described can be constructed and assembled in a simple manner since its gear box 34 is supported completely by the lower trapezoidal portion 16 of the plate 13 so that said portion affords a frame part which maintains not only the gear box 34 but the shaft 38 and the spreading member 42 in their appointed places. The strip 20 has its lower edge located at a level beneath that of the bottom of the gear box 34 so that said strip constitutes a ground support with the aid of which the implement can be stood upright on the ground in a stable position. The agitator 49 can be quickly released from the upper end region 48 of the shaft 38 after which the plate 57, the control member 67 and the parts that are connected thereto can easily be removed. The appreciable clearance between the parts 57 and 67 and the shaft 38, after removal of the sleeve 50, greatly facilitates this. The implement is particularly suitable for spreading powdered and granular artificial fertilizer over the ground but it will be appreciated that it can also be used for spreading lime, sand, seeds and other similar materials.

FIG. 6 illustrates an alternative way of restraining the control rod 76 from returning in a direction opposite to the direction 84 under the action of the spring 71. In this construction, the bracket 78 is replaced by an inverted L-shaped bracket 87 to the horizontal limb of which an upwardly inclined blade spring 85 is fastened. The blade spring 85 is formed approximately centrally with a hole 86 through which the control rod 76 is entered. The spring 71 pulls the rod 76 in a direction opposite to the arrow 84 (i.e. to the right in FIG. 6) and this resiliently deforms the blade spring 85 causing the edges of the hole 86 to firmly engage the rod 76 and prevent displacement of said rod 76. Release of the rod 76 to allow it to move under the action of the spring 71 is achieved readily merely by grasping the upper end of the blade spring 85 and moving the latter into an approximately vertical position so that the rod 76 can slide easily through the hole 86.

I claim:

1. A spreading implement having a frame and a container supported by said frame, a spreader member rotatably mounted on a shaft beneath said container, said shaft being journaled in a bearing carried by said frame, means for rotating said shaft and spreader member, said frame including a vertically extending frame portion provided with coupling means to be coupled to the lifting device of a tractor, said frame including a lower portion extending horizontally to form a support for resting the implement on the ground, at least part of said lower supporting portion being located at a lower level than said bearing, a plate member extending from said vertically extending portion in the same direction as said lower frame portion, said plate member being secured to a ring member connected to the lower end of said container, said plate member having a rim extending downwardly along part of said vertically extending frame portion and along at least part of said spreader member, said plate member being positioned above said spreader member, two adjustable outlet plates being borne by the lower end of said container and each of said outlet plates having at least one outlet port, control members connected to each of said adjustable outlet plates to adjust said plates relative to one another and to said container.

2. A spreading implement comprising a frame, a container for material to be spread supported by said frame and a rotatable spreading member, said frame including a plate member secured to a strip member with the former connected also to the lower end of said container, said plate member being further connected to a generally vertical portion of said frame, a rim of said plate member extending around at least part of said spreading member, a lower frame portion at the bottom of said frame forming a supporting member for resting the implement on the ground, said spreading member being mounted rotatably on a shaft beneath said container, said shaft being journaled in a bearing carried by said frame, means for rotating said shaft and said spreading member, said shaft extending upwardly through an opening in the bottom of said container whereby there is a minimum of space between the circumference of said opening and the circumference of said shaft, a rim portion at the bottom of said container extending around said opening and extending upwardly from said bottom, agitating means being connected to said shaft above said opening and said agitating means having a platelike portion lying over said opening and said rim portion.

3. A spreading implement comprising a frame, a container for material to be spread supported by said frame and a rotatable spreading member, said frame being L-shaped when viewed in side elevation and having an upwardly extending frame portion and a horizontally extending lower, frame portion, said lower frame portion forming a supporting member for resting the implement on the ground, said spreading member being mounted on a shaft journaled in a bearing carried by said frame, means for rotating said shaft and said spreader member, said upwardly extending frame portion including a plate member connected to the lower end of said container, a reinforcing beam mounted on the side of said container to extend upwardly along said container from the lower end to near its upper end, a stiffening strip being connected to said beam and one end of said upstanding frame portion, said stiffening strip being also connected to said plate member adjacent the connection of said plate member to said container, adjustable outlet plates mounted at the lower end of said container whereby each of said outlet plates has at least one outlet opening, control means being connected with said outlet plates to fix selectively said outlet plates in any one of a plurality of positions relative to said container, said plate member having an integral rim extending along said upstanding frame portion and around at least part of the circumference of said spreading member.

4. A spreading implement comprising a frame and a container supported on said frame, a spreader member rotatably mounted on a shaft beneath said container, a lower region of said container being an outlet plate having at least one closable port turnable in various directions, said outlet plate bearing upon a ring carried by said frame mounted adjacent said lower region of said container, said shaft extending up through said outlet plate in said container, and an agitator in said container releasably connected to the upper end of said shaft restrain the upward displacement of said outlet plate.

5. An implement as claimed in claim 4, wherein a guide strip is secured relative to said frame and said outlet plate is provided with a setting arm that can be moved to any one of a plurality of different positions with respect to said strip.

6. An implement as claimed in claim 4, wherein said container is a hopper with a downwardly tapering configuration.

7. An implement as claimed in claim 4, wherein said agitator includes a substantially vertically disposed portion.

8. An implement as claimed in claim 4, wherein a control member is mounted beneath said outlet plate to be relatively displaceable relative thereto whereby the effective open area of said outlet can be altered, said outlet plate and said control member being connected to adjusting means, so as to be retainable in any one of a number of different positions with respect to said container.

9. An implement as claimed in claim 4, wherein at least a lower region of said container is detachably secured to the frame.

10. An implement as claimed in claim 4, wherein a U-shaped plate is supported on the frame adjacent said spreader member, said U-shaped plate being mounted so that plate parts thereof extend above and below said spreader member and an intermediate segment forms a barrier to prevent material from being spread in an undesired direction.

11. An implement as claimed in claim 10, wherein, when viewed in plan, said parts are of trapezoidal configuration.

12. A spreading implement comprising a frame, a container for material to be spread supported by said frame and a rotatable spreading member positioned below said container, said frame being L-shped, when viewed in side elevation, and having an upwardly extending frame portion and a lower horizontally extending frame portion, said lower frame portion forming a supporting member for resting the implement on the ground, said spreading member being mounted on a shaft journaled in a bearing carried by said frame, means for rotating said shaft and said spreader member, said upwardly extending frame portion including a plate member connected to the lower end of said container, a stiffening strip being connected with its upper end to the upper portion of said upwardly extending frame portion, said stiffening strip being connected at its lower side to said plate member adjacent the connection of said plate member to said container, the upper end of said stiffening strip being also connected to the container, an outlet opening being provided at the lower end of said container and an adjustable plate being connected to the lower end of said container to open said outlet opening more or less, control means being connected with said plate to fix selectively said plate in any one of a plurality of positions relative to said container, said plate member having an integral rim extending along said upstanding frame portion and around at least part of the circumference of said spreading member.

13. An implement as claimed in claim 12, wherein said bearing is part of a gear box that contains gear means for transmitting rotation to said shaft.

14. A spreading implement having a frame and a container supported by said frame, a spreading member rotatably mounted on a shaft beneath said container, said shaft being journaled in a bearing carried by said frame, means for rotating said shaft and spreader member, said frame including a vertically extending frame portion provided with coupling means to be coupled to the lifting device of a tractor, said frame portion including two strips situated at opposite sides of a vertical plane containing the longitudinal axis of the implement and parts of which converge upwardly, the upper ends of said strips having coupling means for connection to the upper arm of a lifting device of a tractor, the lower ends of said strips having further coupling means for connection to the lower arms of the lifting device of a tractor, said frame including a lower portion extending horizontally to form a support for resting said implement on the ground, said lower portion being provided with two strips arranged in V-shaped relationship to one another diverging forwardly, at least part of said lower supporting portion being located at a lower level than said bearing, a plate member extending from said vertically extending portion in the same direction as said lower frame portion, said plate member being connected to a ring member secured to the lower end of said container, said plate member having a rim extending downwardly along part of said vertically extending frame portion and along at least part of said frame member, said plate member being position above said spreading member, outlet openings being provided at the lower end of said container and an adjustable outlet plate being located adjacent the lower end of said container, said outlet plate being adjustable to open more or less said outlet openings, control means connected to said outlet plate to adjust said plate relative to the lower end of said container.

15. An implement as claimed in claim 14, wherein said control member is provided with an adjusting arm which is movable along a guide, locking means associated with said adjusting arm to fix same in any chosen position with respect to said guide.

16. A spreading implement having a frame and a container supported by said frame, a spreader member rotatably mounted on a shaft beneath said container, said shaft being journaled in a bearing carried by said frame, means for rotating said shaft and spreader member, said frame including an upwardly extending frame portion provided with coupling means to be coupled to the lifting device of a tractor, said frame including a lower portion extending horizontally to form a support for resting the implement on the ground, at least part of said lower portion being located at a lower level than said bearing, a plate member extending from said upwardly extending frame portion in the same direction as said lower frame portion, said plate member being releasably secured to a ring member connected to the lower end of said container, the upper end of said upwardly extending frame portion being detachably connected with said container, said plate member having a rim extending downwardly along part of said upwardly extending frame portion and adjacent at least part of said spreader member, said plate member being positioned above said spreader member, at least one outlet opening at the lower end of said container, and an outlet plate with at least one outlet port being movable relative to the lower end of said container to open more or less said outlet opening, a control member connected to said outlet plate to adjust the position of said port relative to the bottom of said container.

17. A spreading implement comprising a frame, a container for material to be spread supported by said frame and a rotatable spreading member, said frame including a plate member secured to the lower end of said container, said plate member extending from a generally vertical portion of said frame, a lower portion at the bottom of said frame forming a supporting member for resting the implement on the ground, said spreading member being mounted rotatably on a shaft which extends beneath said container, said shaft being journaled in a bearing carried by said frame, means for rotating said shaft and said spreading member, said shaft extending upwardly through an opening in the bottom of said container whereby there is a minimum of space between the circumference of said opening and the circumference of said shaft, a rim portion at the bottom of said container extending around said opening and extending upwardly from said bottom, agitating means mounted on said shaft above said opening, said agitating means having a platelike portion lying over said opening said rim portion, at one side of said shaft, said platelike portion having a port which extends upwardly adjacent the wall of said container.

18. A spreading implement having a frame and a container supported by said frame, a spreader member rotatably mounted on a shaft beneath said container, said shaft being journaled in a bearing carried by said frame, means for rotating said shaft and spreader member, said frame being L-shaped in side elevation and having a vertically extending frame portion and a lower horizontally extending frame portion, said horizontally extending portion forming an independent supporting portion for resting the implement on the ground, at least part of said lower portion being located at a lower level than said bearing, said vertically extending portion of the frame having upwardly converging strips, the upper ends of which are parallel to one another and are provided with aperture to connect the upper end of the vertically extending portion of the frame with the upper arm of the lifting device of a prime mover, the lower end of said strips being provided with horizontally extending pins so as to couple the implement to the lower arms of the lifting device of a prime mover, a plate member being connected to said vertically extending frame portion and to the lower end of said container, said plate member having a rim extending downwardly along said vertically extending frame portion to connect said strips of the frame portion, two rotatable outlet plates being positioned by the lower end of said container and each of said plates having at least one opening port, control members connected to each of said plates to rotatably adjust said plates relative to one another and to said container.